United States Patent
Obiya et al.

(10) Patent No.: US 9,407,315 B2
(45) Date of Patent: Aug. 2, 2016

(54) TRANSMISSION/RECEPTION DEVICE

(71) Applicant: Murata Manufacturing Co., Ltd., Kyoto (JP)

(72) Inventors: Hidenori Obiya, Kyoto (JP); Shinya Mizoguchi, Kyoto (JP); Shinya Hitomi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/688,448

(22) Filed: Apr. 16, 2015

(65) Prior Publication Data

US 2015/0222320 A1     Aug. 6, 2015

Related U.S. Application Data

(63) Continuation of application No. PCT/JP2013/076705, filed on Oct. 1, 2013.

(30) Foreign Application Priority Data

Oct. 17, 2012    (JP) .................................. 2012-229837

(51) Int. Cl.
*H04B 1/10*        (2006.01)
*H04B 1/48*        (2006.01)
*H04B 1/525*      (2015.01)

(52) U.S. Cl.
CPC . *H04B 1/48* (2013.01); *H04B 1/525* (2013.01)

(58) Field of Classification Search
CPC ............. H04B 1/525; H04B 1/48; H04B 1/40
USPC ........ 455/73, 78, 82, 83, 87, 63.1, 114.2, 296
See application file for complete search history.

(56) References Cited

U.S. PATENT DOCUMENTS 8,320,850 B1 * 11/2012 Khlat ....................... H03H 7/40
                                                                              455/107
8,798,179 B2 * 8/2014 Koizumi .............. H04B 1/0475
                                                                              370/338

(Continued)

FOREIGN PATENT DOCUMENTS

CN         102111358 A      6/2011
JP          48-33753 A       5/1973

(Continued)

OTHER PUBLICATIONS

International Search Report issued in Application No. PCT/JP2013/076705 dated Nov. 12, 2013.

(Continued)

*Primary Examiner* — Tuan Pham
(74) *Attorney, Agent, or Firm* — Pearne & Gordon LLP

(57) ABSTRACT

A transmission filter allows a signal in the frequency band of a transmission signal to pass through the transmission filter and blocks signals in other frequency bands. The transmission signal output from the transmission filter is supplied to an antenna via an antenna sharing device and transmitted to the outside. A reflected-signal detector senses the amplitude and the phase of a reflected signal from the antenna and outputs detection signals (DA and DP). A control circuit adjusts control signals (CA and CP) on the basis of the detection signals (DA and DP). A cancellation-signal-output circuit adjusts a cancellation signal in such a manner that the cancellation signal has a phase opposite to that of the reflected signal and an amplitude the same as that of the reflected signal by using the control signals (CA and CP). A multiplexer combines the cancellation signal with a received signal including a noise signal.

13 Claims, 10 Drawing Sheets

(56) References Cited

U.S. PATENT DOCUMENTS

| | | | | |
|---|---|---|---|---|
| 2007/0249314 A1* | 10/2007 | Sanders | ............ | H04B 1/525 |
| | | | | 455/296 |
| 2010/0222012 A1* | 9/2010 | Shibuya | ............ | H04B 1/525 |
| | | | | 455/79 |
| 2011/0134810 A1 | 6/2011 | Yamamoto | | |

FOREIGN PATENT DOCUMENTS

| JP | H08-79126 A | 3/1996 |
|---|---|---|
| JP | H09-69803 A | 3/1997 |
| JP | H11-274954 A | 10/1999 |
| JP | 2004-194097 A | 7/2004 |
| JP | 2010-062997 A | 3/2010 |
| JP | 2011-120120 A | 6/2011 |

OTHER PUBLICATIONS

Translation of Written Opinion issued in Application No. PCT/JP2013/076705 dated Nov. 12, 2013.

* cited by examiner

FIG. 10

| AMPLITUDE OF REFLECTED SIGNAL N1 | AMPLITUDE OF CANCELLATION SIGNAL NC | | | PHASE OF REFLECTED SIGNAL N1 | PHASE OF CANCELLATION SIGNAL NC | | |
|---|---|---|---|---|---|---|---|
| | $T_1$ | $T_2$ | $T_3$ | | $T_1$ | $T_2$ | $T_3$ |
| $A_1$ | $Ac_{11}$ | $Ac_{21}$ | $Ac_{31}$ | $\theta_1$ | $\theta c_{11}$ | $\theta c_{21}$ | $\theta c_{31}$ |
| $A_2$ | $Ac_{12}$ | $Ac_{22}$ | $Ac_{32}$ | $\theta_2$ | $\theta c_{12}$ | $\theta c_{22}$ | $\theta c_{32}$ |
| $A_3$ | $Ac_{13}$ | $Ac_{23}$ | $Ac_{33}$ | $\theta_3$ | $\theta c_{13}$ | $\theta c_{23}$ | $\theta c_{33}$ |
| ⋮ | ⋮ | ⋮ | ⋮ | ⋮ | ⋮ | ⋮ | ⋮ |
| $A_n$ | $Ac_{1n}$ | $Ac_{2n}$ | $Ac_{3n}$ | $\theta_m$ | $\theta c_{1m}$ | $\theta c_{2m}$ | $\theta c_{3m}$ |

85

TRANSMISSION/RECEPTION DEVICE

FIELD OF THE INVENTION

The present invention relates to a transmission/reception device that reduces a noise signal by combining a cancellation signal with a received signal.

DESCRIPTION OF THE RELATED ART

A transmission/reception device in which an antenna is connected by a circulator to each of a transmission circuit and a reception circuit, the transmission/reception device being configured to remove a signal reflected by the antenna and a signal leaked from the circulator by combining a cancellation signal with a received signal, is known as an example of the related art (see, for example, Patent Document 1).

Patent Document 1: Japanese Unexamined Patent Application Publication No. 8-79126

BRIEF SUMMARY OF THE INVENTION

The configuration described in Patent Document 1 is applied to, for example, a device, such as a radar device, in which the frequencies of a transmission signal and a received signal are the same as each other. In this case, a free space is often ensured around the periphery of an antenna, and the impedance of the antenna is substantially constant. Accordingly, in the transmission/reception device described in Patent Document 1, variations in a reflected signal are not taken into consideration.

In contrast, in the case of, for example, a cellular phone, a portable terminal, or the like, a user's hand or the like often comes close to the periphery of an antenna, and the impedance of the antenna varies with a usage state. In this case, along with variations in the impedance of the antenna, the amplitude and the phase of a reflected signal also vary, and thus, there has been a problem in that the variations in the impedance of the antenna need to be taken into consideration in order to sufficiently reduce a noise signal, such as the reflected signal.

The present invention has been made in view of such a problem described above, and it is an object of the present invention to provide a transmission/reception device capable of reducing a noise signal given to the impedance of an antenna.

(1). To solve the above-described problem, a transmission/reception device according to the present invention includes a transmission circuit, a reception circuit, an antenna, an antenna sharing device that connects the antenna and the transmission circuit and connects the antenna and the reception circuit, reflected-signal-detection means that is disposed between the antenna sharing device and the antenna and that detects a reflected signal that is part of a transmission signal, which is output from the transmission circuit, reflected by the antenna, a duplexer that is disposed between the antenna sharing device and the transmission circuit and that retrieves a signal from the transmission signal, a cancellation-signal-output circuit that outputs a cancellation signal used for cancelling the reflected signal, which is the part of the transmission signal reflected by the antenna, on the basis of the signal retrieved by the duplexer, a multiplexer that is disposed between the antenna sharing device and the reception circuit and that combines the cancellation signal with a received signal that is to be input to the reception circuit, and a control circuit that controls the cancellation-signal-output circuit. The control circuit adjusts an amplitude and a phase of the cancellation signal on the basis of an amplitude and a phase of the reflected signal detected by the reflected-signal-detection means.

According to the present invention, in the case where the control circuit adjusts the amplitude and the phase of the cancellation signal on the basis of the amplitude and the phase of the reflected signal, the cancellation signal can be adjusted in accordance with changes in the phase and the amplitude of the reflected signal. As a result, even if the amplitude and the phase of the reflected signal change along with a change in the impedance of the antenna, the phase and the amplitude of the cancellation signal can be adjusted in such a manner that the cancellation signal has a phase opposite to that of the reflected signal and an amplitude the same as that of the reflected signal, so that the reflected signal can be removed.

(2). The transmission/reception device according to the present invention includes a transmission circuit, a reception circuit, an antenna, an antenna sharing device that connects the antenna and the transmission circuit and connects the antenna and the reception circuit, reflected-signal-detection means that is disposed between the antenna sharing device and the antenna and that detects a reflected signal that is part of a transmission signal, which is output from the transmission circuit, reflected by the antenna, a transmission filter that is connected to the transmission circuit and that allows a signal in a frequency band of the transmission signal to pass through the transmission filter and blocks signals in other frequency bands, a duplexer that is disposed between the antenna sharing device and the a transmission filter and that retrieves a signal from the transmission signal, a cancellation-signal-output circuit that outputs a cancellation signal used for cancelling the reflected signal, which is the part of the transmission signal reflected by the antenna, on the basis of the signal retrieved by the duplexer, a multiplexer that is disposed between the antenna sharing device and the reception circuit and that combines the cancellation signal with a received signal that is to be input to the reception circuit, and a control circuit that controls the cancellation-signal-output circuit. The control circuit adjusts an amplitude and a phase of the cancellation signal on the basis of an amplitude and a phase of the reflected signal detected by the reflected-signal-detection means.

According to the present invention, in the case where the control circuit adjusts the amplitude and the phase of the cancellation signal on the basis of the amplitude and the phase of the reflected signal, the cancellation signal can be adjusted in accordance with changes in the phase and the amplitude of the reflected signal. As a result, even if the amplitude and the phase of the reflected signal change along with a change in the impedance of the antenna, the phase and the amplitude of the cancellation signal can be adjusted in such a manner that the cancellation signal has a phase opposite to that of the reflected signal and an amplitude the same as that of the reflected signal, so that the reflected signal can be removed.

In addition, since the transmission circuit is provided with the transmission filter, the transmission filter can allow a signal in the frequency band of the transmission signal to pass through the transmission filter and can block signals in other frequency bands. Here, in the case where the frequency bands of the transmission signal and the received signal are different from each other, the isolation between the transmission circuit and the reception circuit can be improved by the transmission filter. In other words, even in the case where noise signals such as the reflected signal from the antenna and a leaked signal that passes through the antenna sharing device are generated in the frequency band of the transmission signal, the influence of the noise signals on the frequency band of the received signal is small. In this case, the leaked signal has an amplitude smaller than that of the reflected signal, and the isolation between the transmission circuit and the reception circuit for the leaked signal can be sufficiently improved by the antenna sharing device and the transmission filter. Thus, since the influence of the leaked signal on the received signal can be ignored, the cancellation-signal-output circuit may cancel out only the reflected signal, and the circuit configuration can be simplified.

(3). The transmission/reception device according to the present invention includes a transmission circuit, a reception circuit, an antenna, an antenna sharing device that connects the antenna and the transmission circuit and connects the antenna and the reception circuit, reflected-signal-detection means that is disposed between the antenna sharing device and the antenna and that detects a reflected signal that is part of a transmission signal, which is output from the transmission circuit, reflected by the antenna, a duplexer that is disposed between the transmission circuit and the antenna sharing device and that retrieves a signal from the transmission signal, a filter circuit that is disposed between the duplexer and the antenna sharing device and that causes a signal desired to be cancelled in a frequency band of the transmission signal to be attenuated, a cancellation-signal-output circuit that outputs a cancellation signal used for cancelling the reflected signal, which is the part of the transmission signal reflected by the antenna, on the basis of the signal retrieved by the duplexer, a multiplexer that is disposed between the antenna sharing device and the reception circuit and that combines the cancellation signal with a received signal that is to be input to the reception circuit, and a control circuit that controls the cancellation-signal-output circuit. The control circuit adjusts an amplitude and a phase of the cancellation signal on the basis of an amplitude and a phase of the reflected signal detected by the reflected-signal-detection means.

According to the present invention, in the case where the control circuit adjusts the amplitude and the phase of the cancellation signal on the basis of the amplitude and the phase of the reflected signal, the phase and the amplitude of the cancellation signal can be adjusted in accordance with changes in the phase and the amplitude of the reflected signal in such a manner that the cancellation signal has a phase opposite to that of the reflected signal and an amplitude the same as that of the reflected signal, so that the reflected signal can be removed. In addition, since the filter circuit is disposed on a connection line connecting the antenna sharing device and the duplexer, a signal in a frequency band that is desired to be cancelled can be attenuated by the filter circuit. The signal in the frequency band, which is desired to be cancelled, is attenuated, and accordingly, the load of a section that adjusts the amplitude of the cancellation signal is reduced.

(4). The transmission/reception device according to the present invention includes a transmission circuit, a reception circuit, an antenna, an antenna sharing device that connects the antenna and the transmission circuit and connects the antenna and the reception circuit, reflected-signal-detection means that is disposed between the antenna sharing device and the antenna and that detects a reflected signal that is part of a transmission signal, which is output from the transmission circuit, reflected by the antenna, a transmission filter that is connected to the transmission circuit and that allows a signal in a frequency band of the transmission signal to pass through the transmission filter and blocks signals in other frequency bands, a duplexer that is disposed between the antenna sharing device and the transmission filter and that retrieves a signal from the transmission signal, a filter circuit that is disposed between the duplexer and the antenna sharing device and that causes a signal desired to be cancelled in the frequency band of the transmission signal to be attenuated, a cancellation-signal-output circuit that outputs a cancellation signal used for cancelling the reflected signal, which is the part of the transmission signal reflected by the antenna, on the basis of the signal retrieved by the duplexer, a multiplexer that is disposed between the antenna sharing device and the reception circuit and that combines the cancellation signal with a received signal that is to be input to the reception circuit, and a control circuit that controls the cancellation-signal-output circuit. The control circuit adjusts an amplitude and a phase of the cancellation signal on the basis of an amplitude and a phase of the reflected signal detected by the reflected-signal-detection means.

According to the present invention, in the case where the control circuit adjusts the amplitude and the phase of the cancellation signal on the basis of the amplitude and the phase of the reflected signal, the phase and the amplitude of the cancellation signal can be adjusted in accordance with changes in the phase and the amplitude of the reflected signal in such a manner that the cancellation signal has a phase opposite to that of the reflected signal and an amplitude the same as that of the reflected signal, so that the reflected signal can be removed. In addition, the isolation between the transmission circuit and the reception circuit for the leaked signal can be sufficiently improved by the antenna sharing device and the transmission filter. Thus, since the influence of the leaked signal on the received signal can be ignored, the cancellation-signal-output circuit may cancel out only the reflected signal, and the circuit configuration can be simplified. Furthermore, a signal in a frequency band that is desired to be cancelled can be attenuated by the filter circuit. The signal in the frequency band, which is desired to be cancelled, is attenuated, and accordingly, the load of a section that adjusts the amplitude of the cancellation signal is reduced.

(5). In the present invention, the transmission filter is formed of a transmission tunable filter that selects any one of a plurality of the transmission signals in a plurality of frequency bands and allows the selected transmission signal to pass through the transmission tunable filter.

According to the present invention, since the transmission filter is formed of the transmission tunable filter, for example, in the case where the transmission circuit outputs transmission signals in a plurality of frequency bands, the transmission tunable filter can select one of the transmission signals in any one of the plurality of frequency bands and allow the selected transmission signal to pass through the transmission tunable filter. Thus, a signal in a frequency band, which is undesirable and is not transmitted, will not be mixed into the cancellation signal.

(6). In the present invention, the filter circuit is formed of a tunable filter that selects any one of a plurality of the transmission signals in a plurality of frequency bands and allows the selected transmission signal to pass through the tunable filter.

According to the present invention, since the filter circuit is formed of the tunable filter, for example, in the case where the transmission circuit outputs transmission signals in a plurality of frequency bands, the tunable filter can select one of the transmission signals in any one of the plurality of frequency bands and allow the selected transmission signal to pass through the tunable filter. Thus, a signal in a frequency band, which is undesirable and is not transmitted, will not be mixed into the cancellation signal.

(7). In the present invention, a delay circuit is disposed on at least one of first and second connection lines, the first connection line connecting the duplexer and the multiplexer via the cancellation-signal-output circuit and the second connection line connecting the duplexer and the multiplexer via the antenna sharing device.

According to the present invention, in the case where the cancellation-signal-output circuit is provided with the delay circuit, even in the case where the line length between the antenna sharing device and the antenna is large, and where delay, for which only performing a phase adjustment is insufficient, occurs in the reflected signal, the cancellation signal, which has a phase opposite to that of the reflected signal and an amplitude the same as that of the reflected signal, can be combined with the received signal including noise signals by delaying a signal by the delay circuit. In addition, in the case where the delay circuit is disposed so as to be positioned at an intermediate portion of the second connection line connecting the duplexer and the multiplexer via the antenna sharing device, even if delay occurs in the cancellation signal along with amplitude and phase adjustments, the cancellation signal, which has a phase opposite to that of the reflected signal and an amplitude the same as that of the reflected signal, can be combined with the received signal including noise signals by delaying a signal by the delay circuit.

(8). In the present invention, the antenna sharing device is formed of a circulator.

According to the present invention, since the antenna sharing device is formed of the circulator, the frequency bands of the transmission signal and the received signal can be widened compared with the case where the antenna sharing device is formed of, for example, a duplexer.

BRIEF DESCRIPTION OF THE SEVERAL VIEWS OF THE DRAWINGS

FIG. 10 is a table illustrating an amplitude-and-phase-adjustment map stored in a memory of a control circuit illustrated in FIG. 9.

DETAILED DESCRIPTION OF THE INVENTION

Transmission/reception devices according to embodiments of the present invention in the case where the transmission/reception devices are applied to communication devices will be described below as examples with reference to the accompanying drawings.

Figure 1:
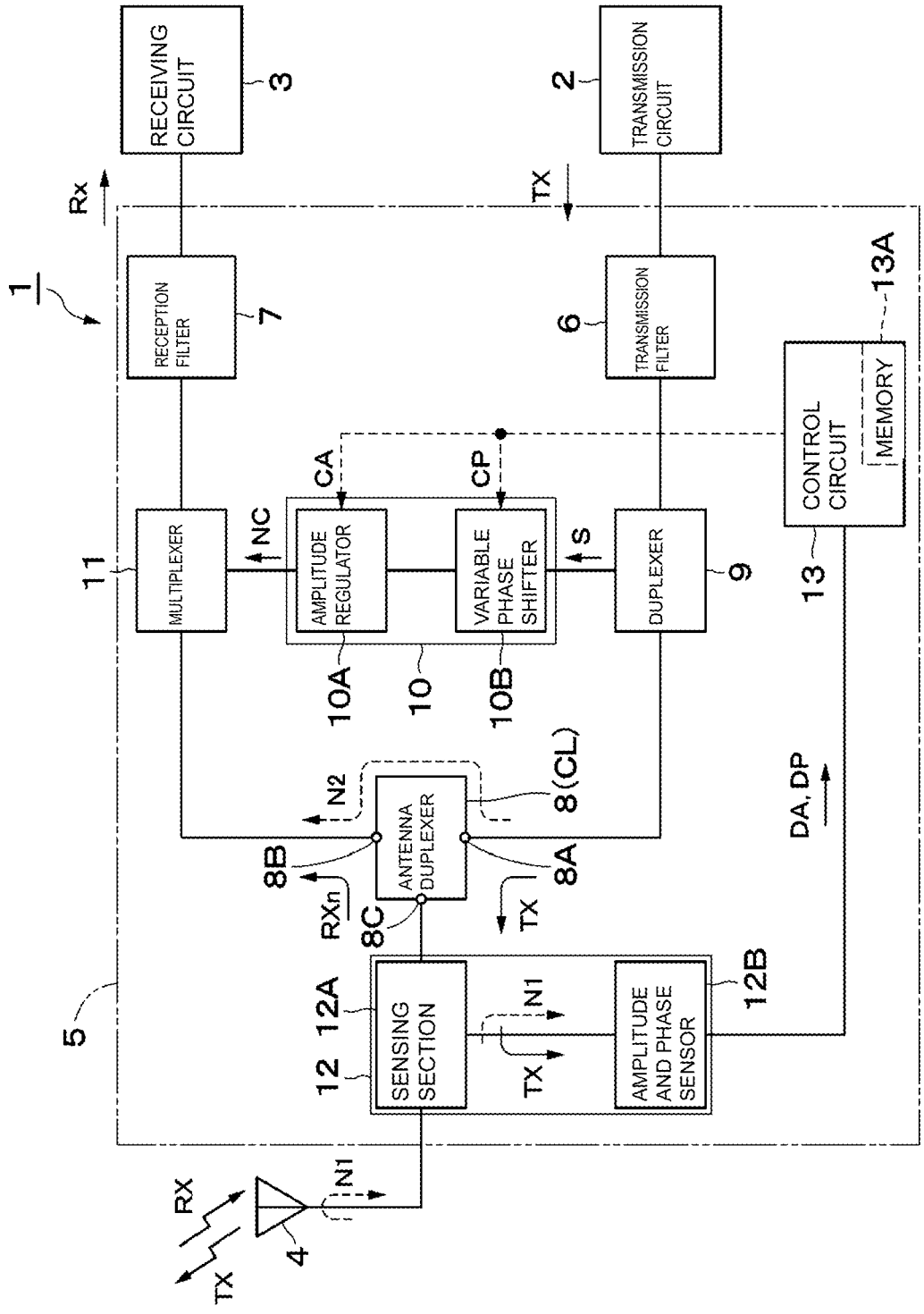
FIG. 1 is a block diagram illustrating a communication device according to a first embodiment.
Figure 2:
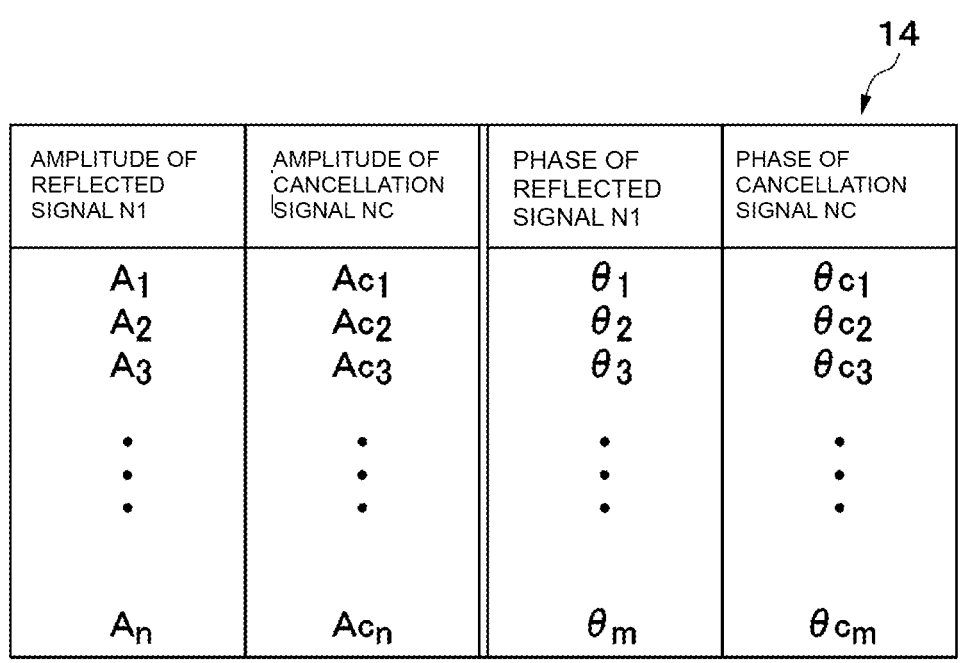
FIG. 2 is a table illustrating an amplitude-and-phase-adjustment map stored in a memory of a control circuit illustrated in FIG. 1.

A first embodiment of the present invention is illustrated in FIG. 1 and FIG. 2. A communication device 1 includes a transmission circuit 2, a reception circuit 3, an antenna 4, and a noise cancellation device 5.

The transmission circuit 2 outputs a transmission signal TX in a frequency band Ft1 of, for example, several hundreds of MHz or several GHz. The transmission signal TX is transmitted to the outside from the antenna 4. The reception circuit 3 demodulates a received signal RX in a frequency band Fr1 of, for example, several hundreds of MHz or several GHz. The received signal RX is to be received by the antenna 4. In this case, the frequency band Fr1 of the received signal RX and the frequency band Ft1 of the transmission signal TX are different from each other.

The noise cancellation device 5 is disposed between the antenna 4, the transmission circuit 2, and the reception circuit 3 and includes a transmission filter 6, a reception filter 7, an antenna sharing device 8, a duplexer 9, a cancellation-signal-output circuit 10, a multiplexer 11, a reflected-signal detector 12, and a control circuit 13, each of which will be described below.

The transmission filter 6 is connected to an output terminal of the transmission circuit 2. The transmission filter 6 allows the transmission signal TX in the frequency band Ft1, which is output from the transmission circuit 2, to pass through the transmission filter 6 and blocks signals in other frequency bands.

On the other hand, the reception filter 7 is connected to an input terminal of the reception circuit 3. The reception filter 7 allows the received signal RX in the frequency band Fr1, which is to be input to the reception circuit 3, to pass through the reception filter 7 and blocks signals in other frequency bands. Thus, signals, including the transmission signal TX, in frequency bands other than the frequency band Fr1 of the received signal RX are attenuated and removed by the reception filter 7.

Note that although the frequency band Ft1 of the transmission signal TX has a bandwidth of, for example, about 60 MHz, the frequency bandwidth of the transmission signal TX that is actually used is, for example, about 5 MHz. Thus, the transmission filter 6 may be formed of a narrow-band tunable filter that allows only signals in the frequency bandwidth that is used among the frequency band Ft1 of the transmission signal TX to pass through the narrow-band tunable filter. Similarly, the reception filter 7 may also be formed of a narrow-band tunable filter that allows only signals in the frequency bandwidth that is used among the frequency band Fr1 of the received signal RX to pass through the narrow-band tunable filter.

The antenna sharing device 8 is connected between the antenna 4, the transmission circuit 2, and the reception circuit 3 and isolates the transmission signal TX and the received signal RX from each other in such a manner that the transmission signal TX and the received signal RX will not mix with each other. A circulator, a duplexer, or the like is used as the antenna sharing device 8. In the following description, a circulator CL will be described as an example of the antenna sharing device 8. The circulator CL has a three-terminal structure and includes terminals 8A, 8B, and 8C. The terminal 8A of the circulator CL is connected to the transmission circuit 2, and the transmission signal TX is to be input to the terminal 8A. The terminal 8B of the circulator CL is connected to the reception circuit 3, and the received signal RX, which is received by the antenna 4, is to be output from the terminal 8B. The terminal 8C of the circulator CL is connected to the antenna 4. The transmission signal TX is to be output from the terminal 8C, and the received signal RX is to be input to the terminal 8C.

The circulator CL outputs the transmission signal TX, which is input to the terminal 8A, to the antenna 4 from the terminal 8C and outputs the received signal RX, which is input to the terminal 8C via the antenna 4, to the reception circuit 3 from the terminal 8B.

Here, when the impedance of the antenna 4 changes, part of the transmission signal TX, which has been output from the terminal 8C of the circulator CL, is reflected by the antenna 4 as a reflected signal N1, and the reflected signal N1 is input to the terminal 8C and output from the terminal 8B. Although the circulator CL prevents the transmission signal TX and the received signal RX from interfering with each other, the circulator CL cannot completely prevent the transmission signal TX and the received signal RX from interfering with each other. As a result, leakage of the transmission signal TX, which has been input to the terminal 8A, occurs, and a leaked signal N2, which is generated as a result of the leakage of the transmission signal TX, is output from the terminal 8B, from which the received signal RX is output. Thus, the original received signal RX, which has been received by the antenna 4, and the reflected signal N1 and the leaked signal N2 of the transmission signal TX mix with one another and are output from the terminal 8B of the circulator CL as a received signal RXn that includes these noise signals.

The duplexer 9 is connected between the circulator CL and the transmission circuit 2. The duplexer 9 transmits the transmission signal TX, which is output from the transmission circuit 2, to the circulator CL and retrieves a signal from the transmission signal TX. More specifically, the duplexer 9 separates part of the transmission signal TX from the transmission signal TX as a separated signal S and outputs the separated signal S to the cancellation-signal-output circuit 10.

The cancellation-signal-output circuit 10 outputs a cancellation signal NC on the basis of the separated signal S retrieved by the duplexer 9. Here, the cancellation signal NC cancels out the reflected signal N1 of the transmission signal TX generated at the antenna 4 (i.e., the cancellation signal NC and the reflected signal N1 cancel each other out).

The cancellation-signal-output circuit 10 controls the amplitude and the phase of the separated signal S, which has been separated from the transmission signal TX, and outputs the separated signal S as the cancellation signal NC to the multiplexer 11. The cancellation-signal-output circuit 10 includes an amplitude regulator 10A that adjusts the amplitude of the separated signal S and a variable phase shifter 10B that adjusts the phase of the separated signal S. The cancellation-signal-output circuit 10 controls (adjusts), while the separated signal S functions as a reference, the amplitude and the phase of the cancellation signal NC on the basis of control signals CA and CP output from the control circuit 13, which will be described later, in such a manner as to make the cancellation signal NC a signal having a phase opposite to the phase of the reflected signal N1 of the transmission signal TX, which is part of the transmission signal TX reflected by the antenna 4, and an amplitude that matches the amplitude of the reflected signal N1. Then, the cancellation-signal-output circuit 10 outputs the cancellation signal NC to the multiplexer 11.

The multiplexer 11 is connected between the circulator CL and the reception circuit 3. The multiplexer 11 combines the cancellation signal NC, which has been output from the cancellation-signal-output circuit 10, with the received signal RXn, which has been output from the circulator CL and which includes the noise signals. As a result, the multiplexer 11 outputs a received signal Rx that is obtained by removing the reflected signal N1 of the transmission signal TX from the received signal RXn to the reception circuit 3. In the multiplexer 11, the reflected signal N1, which is part of the transmission signal TX reflected by the antenna 4, and the cancellation signal NC cancel each other out, and the received signal Rx that is substantially similar to the received signal RX received by the antenna 4 can be obtained.

The reflected-signal detector 12 is disposed between the circulator CL and the antenna 4 and detects the reflected signal N1 of the transmission signal TX, which has been output from the transmission circuit 2, the reflected signal N1 being generated at the antenna 4. The reflected-signal detector 12 includes a sensing section 12A and an amplitude-and-phase sensor 12B and forms reflected-signal-detection means.

The sensing section 12A detects the reflected signal N1, which is obtained as a result of part of the transmission signal TX being reflected by the antenna 4. The sensing section 12A is formed of, for example, a directional coupler and outputs the transmission signal TX and the reflected signal N1 individually by isolating the transmission signal TX and the reflected signal N1 from each other.

The amplitude-and-phase sensor 12B senses the amplitude and the phase of the reflected signal N1. More specifically, the amplitude-and-phase sensor 12B senses the amplitude of the reflected signal N1 output from the sensing section 12A and senses the phase difference between the transmission signal TX and the reflected signal N1, which are output from the sensing section 12A, by comparing the transmission signal TX and the reflected signal N1. Then, the amplitude-and-phase sensor 12B outputs a detection signal DA (amplitude detection signal) that corresponds to the amplitude of the reflected signal Ni and a detection signal DP (phase detection signal) that corresponds to the phase of the reflected signal N1 to the control circuit 13, which will be described below.

The control circuit 13 controls the cancellation-signal-output circuit 10. The control circuit 13 adjusts the amplitude and the phase of the cancellation signal NC on the basis of the amplitude and the phase of the reflected signal N1 detected by the reflected-signal detector 12.

More specifically, the control circuit 13 outputs the control signals CA and CP for controlling the amplitude and the phase of the separated signal S to the cancellation-signal-output circuit 10 on the basis of the detection signals DA and DP, which are output from the amplitude-and-phase sensor 12B.

Here, the control circuit 13 includes a memory 13A. As illustrated in FIG. 2, an amplitude-and-phase-adjustment map 14, in which relationships between the amplitude and the phase of the reflected signal N1 and the amplitude and the phase of the cancellation signal NC that cancels out the reflected signal N1 are recorded, is stored in the memory 13A.

In the amplitude-and-phase-adjustment map 14, for example, the amplitude of the reflected signal N1 is divided into n ranges (amplitudes $A_1$ to $A_n$), and the phase of the reflected signal N1 is divided into m ranges (phases $\theta_1$ to $\theta_m$). The numbers of n and m may be the same as each other or may be different from each other. In addition, amplitudes $Ac_1$ to $Ac_n$ of the cancellation signal NC corresponding to the amplitudes $A_1$ to $A_n$ of the reflected signal N1 and phases $\theta c_1$ to $\theta c_m$ of the cancellation signal NC corresponding to the phases $\theta_1$ to $\theta_m$ of the reflected signal N1 are recorded in the amplitude-and-phase-adjustment map 14. The amplitude-and-phase-adjustment map 14 is experimentally obtained given to the characteristics of the antenna 4 and the circulator CL.

When the detection signals DA and DP, which are output from the amplitude-and-phase sensor 12B, are input to the control circuit 13, the control circuit 13 determines the amplitude and the phase of the reflected signal N1 on the basis of the detection signals DA and DP. Then, the control circuit 13 determines the amplitude and the phase of the cancellation signal NC by applying the amplitude and the phase of the reflected signal N1 to the amplitude-and-phase-adjustment map 14 and outputs the control signal CA (amplitude control signal) corresponding to the amplitude and the control signal CP (phase control signal) corresponding to the phase.

In this case, regarding the amplitude and the phase of the cancellation signal NC determined by using the amplitude-and-phase-adjustment map 14, the phase is opposite to that of the reflected signal N1, and the amplitude is the same as that of the reflected signal N1. Consequently, the control circuit 13 adjusts the control signals CA and CP on the basis of the detection signals DA and DP in such a manner as to make the cancellation signal NC have a phase opposite to that of the reflected signal N1 and an amplitude the same as that of the reflected signal N1.

The communication device 1 according to the present embodiment has a configuration such as that described above, and operation of the communication device 1 will now be described.

Once the transmission circuit 2 has output the transmission signal TX, the transmission signal TX is input to the antenna 4 via the circulator CL and transmitted to the outside from the antenna 4. Once the antenna 4 has received the received signal RX, the received signal RX is input to the reception circuit 3 via the circulator CL and demodulated by the reception circuit 3.

In the case where the communication device 1 is a cellular phone, a portable terminal, or the like, the impedance of the antenna 4 changes depending on, for example, how a user holds the communication device 1. Along with a change in the impedance of the antenna 4, mismatching occurs between the antenna 4 and a transmission line (connection wiring line). Thus, part of the transmission signal TX is reflected in such a manner that the reflected signal N1 is generated, and the amplitude and the phase of the reflected signal N1 change in accordance with the impedance of the antenna 4.

In this case, in the noise cancellation device 5, the amplitude-and-phase sensor 12B outputs the detection signals DA and DP, which correspond to the amplitude and the phase of the reflected signal N1, respectively, and thus, the control circuit 13 adjusts the control signals CA and CP on the basis of the detection signals DA and DP. Consequently, the cancellation-signal-output circuit 10 controls the amplitude and the phase of the separated signal S, which has been separated from the transmission signal TX by the duplexer 9, and outputs the cancellation signal NC, which has a phase opposite to that of the reflected signal N1 and an amplitude the same as that of the reflected signal N1. As a result, even if the amplitude and the phase of the reflected signal N1 change, the amplitude and the phase of the cancellation signal NC can be adjusted in such a manner that the cancellation signal NC has a phase opposite to that of the reflected signal N1 and an amplitude the same as that of the reflected signal N1, so that the reflected signal N1 can be removed.

Since the transmission filter 6 is connected to the transmission circuit 2, the transmission filter 6 can allow a signal in the frequency band of the transmission signal TX to pass through the transmission filter 6 and can block signals in other frequency bands. In the case where the frequency bands of the transmission signal TX and the received signal RX are different from each other, the isolation between the transmission circuit 2 and the reception circuit 3 can be improved by the transmission filter 6.

For example, in order to prevent deterioration of reception sensitivity due to undesirable leakage of noise signals from the transmission circuit 2 to the reception circuit 3, the isolation between the transmission circuit 2 and the reception circuit 3 needs to be about 50 dB. Regarding the isolation for the reflected signal N1, assuming that the attenuation of the reflected signal N1 when part of the transmission signal TX, which is the reflected signal N1, is reflected by the antenna 4 is about 10 dB, 40 dB needs to be ensured by the noise cancellation device 5. Regarding the isolation for the leaked signal N2, assuming that the attenuation of the leaked signal N2 by the circulator CL is about 20 dB, 30 dB needs to be ensured by the noise cancellation device 5.

In the case where a transmission filter is omitted as in Patent Document 1, a circuit that cancels out the reflected signal N1 and a circuit that cancels out a leaked signal need to be provided separately, and the circuit configuration becomes complicated. In addition, attenuation of the noise signals according to the above-described required specifications needs to be ensured by the two circuits, and thus, the manufacturing costs are likely to increase.

In contrast, in the present embodiment, since the transmission filter 6 is provided, the isolation between the transmission circuit 2 and the reception circuit 3 for the leaked signal N2 can be set to about 50 dB by setting the isolation of the transmission filter 6 to, for example, about 30 dB. In other words, the isolation between the transmission circuit 2 and the reception circuit 3 for the leaked signal N2 can be set to a predetermined necessary amount by the transmission filter 6 and the circulator CL. Therefore, since the influence of the leaked signal N2 on the received signal RX can be ignored, the cancellation-signal-output circuit 10 may cancel out only the reflected signal N1, and the circuit configuration can be simplified.

In addition, in the case where the isolation of the transmission filter 6 is set to about 30 dB, an isolation of about 40 dB for the reflected signal N1 can be ensured between the transmission circuit 2 and the reception circuit 3 by combining the about 30$d$B and an attenuation of 10 dB, which is obtained as a result of part of the transmission signal TX being reflected by the antenna 4. Accordingly, it is only necessary for the cancellation-signal-output circuit 10 to ensure an attenuation of 10 dB, and thus, the manufacturing costs can be reduced by moderating required specifications for the cancellation-signal-output circuit 10.

Since the antenna sharing device 8 is formed of the circulator CL, the frequency bands of the transmission signal TX and the received signal RX can be widened compared with the case where the antenna sharing device 8 is formed of, for example, a duplexer.

Figure 3:
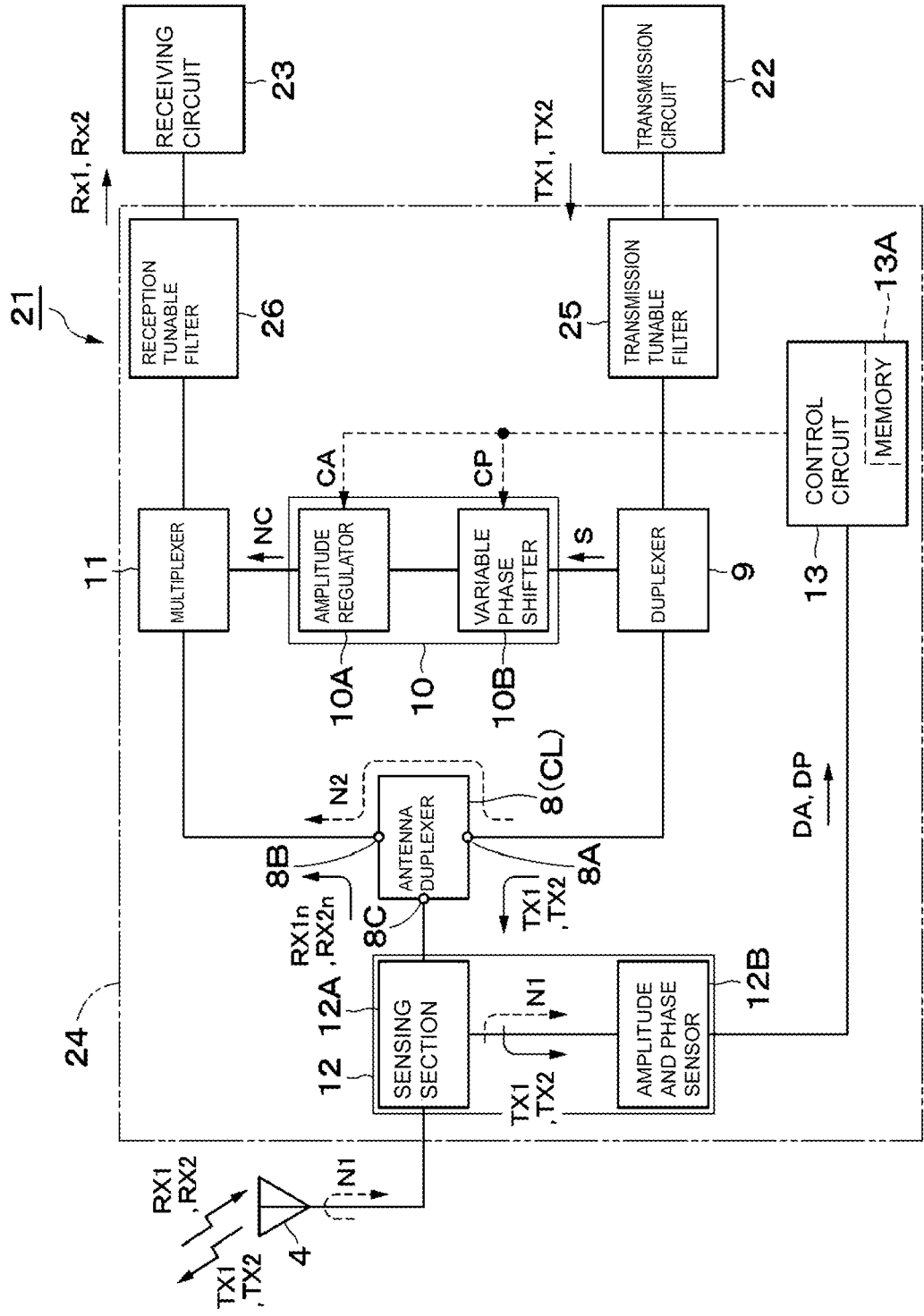
FIG. 3 is a block diagram illustrating a communication device according to a second embodiment.

A second embodiment of the present invention will now be described with reference to FIG. 3. Features of the second embodiment are as follows: the second embodiment is applied to a multi-band communication device, and a transmission filter of such a communication device is formed of a transmission tunable filter that selects, among transmission signals in a plurality of frequency bands, a transmission signal in any one of the plurality of frequency bands and allows the transmission signal to pass through the transmission tunable filter. Note that, in the second embodiment, the same components as in the first embodiment are denoted by the same reference numerals, and descriptions thereof will be avoided.

Substantially similarly to the communication device 1 according to the first embodiment, a communication device 21 includes a transmission circuit 22, a reception circuit 23, the antenna 4, and a noise cancellation device 24.

The transmission circuit 22 outputs transmission signals TX1 and TX2 in two frequency bands Ft1 and Ft2 of, for example, several hundreds of MHz or several GHz. The transmission signals TX1 and TX2 are to be output to the outside from the antenna 4. In this case, the frequency band Ft1 of the transmission signal TX1 and the frequency band Ft2 of the transmission signal TX2 are different from each other.

The reception circuit 23 demodulates received signals RX1 and RX2 in two frequency bands Fr1 and Fr2 of, for example, several hundreds of MHz or several GHz. The received signals RX1 and RX2 are to be received by the antenna 4. In this case, the frequency band Fr1 of the received signal RX1 and the frequency band Fr2 of the received signal RX2 are different from each other. The transmission signal TX1 corresponds to the received signal RX1, and the transmission signal TX2 corresponds to the received signal RX2. Thus, the frequency band Fr1 of the received signal RX1 and the frequency band Ft1 of the transmission signal TX1 are different from each other, and the frequency band Fr2 of the received signal RX2 and the frequency band Ft2 of the transmission signal TX2 are different from each other.

Note that the frequency band Fr1 of the received signal RX1 and the frequency band Ft2 of the transmission signal TX2 may overlap each other or may be different from each other. Similarly, the frequency band Fr2 of the received signal RX2 and the frequency band Ft1 of the transmission signal TX1 may overlap each other or may be different from each other.

The noise cancellation device 24 includes a transmission tunable filter 25, a reception tunable filter 26, the antenna sharing device 8, the duplexer 9, the cancellation-signal-output circuit 10, the multiplexer 11, the reflected-signal detector 12, and the control circuit 13.

The transmission tunable filter 25 forms a transmission filter, selects one of the transmission signals TX1 and TX2 in the two frequency bands Ft1 and Ft2, which are output from the transmission circuit 22, and allows the one of the transmission signals TX1 and TX2 to pass through the transmission tunable filter 25. The reception tunable filter 26 forms a reception filter, selects one of the received signals RX1 and RX2 in the two frequency bands Fr1 and Fr2, which are to be input to the reception circuit 23, and allows the one of the received signals RX1 and RX2 to pass through the reception tunable filter 26.

In this case, the transmission tunable filter 25 and the reception tunable filter 26 operate in conjunction with each other. More specifically, when the transmission tunable filter 25 selects the transmission signal TX1, the reception tunable filter 26 selects the received signal RX1, which corresponds to the transmission signal TX1. Contrary to this, when the transmission tunable filter 25 selects the transmission signal TX2, the reception tunable filter 26 selects the received signal RX2, which corresponds to the transmission signal TX2.

Thus, when the reception tunable filter 26 selects the received signal RX1, signals, including the transmission signal TX1, in frequency bands other than the frequency band Fr1 of the received signal RX1 are attenuated and removed by the reception tunable filter 26. When the reception tunable filter 26 selects the received signal RX2, signals, including the transmission signal TX2 in frequency bands other than the frequency band Fr2 of the received signal RX2 are attenuated and removed by the reception tunable filter 26.

In addition, the multiplexer 11 combines received signals RX1n and RX2n including noise signals with the cancellation signal NC and removes the reflected signal N1. Thus, the reception tunable filter 26 can output received signals Rx1 and Rx2 that are substantially similar to the received signals RX1 and RX2, which are received by the antenna 4.

As described above, advantageous effects similar to those of the first embodiment can be obtained in the second embodiment. In particular, in the second embodiment, since the communication device 21 includes the transmission tunable filter 25 and the reception tunable filter 26, communication can be performed in a wide range of frequency bands.

In addition, since the transmission tunable filter 25 is disposed between the duplexer 9 and the transmission circuit 22, in the case where the transmission circuit 22 outputs the transmission signals TX1 and TX2 in the two frequency bands Ft1 and Ft2, the transmission tunable filter 25 can select one of the transmission signal TX1 in the frequency band Ft1 and the transmission signal TX2 in the frequency band Ft2 and allow the one of the transmission signal TX1 in the frequency band Ft1 and the transmission signal TX2 in the frequency band Ft2 to pass through the transmission tunable filter 25. Thus, the duplexer 9 need not separate part of a signal in a frequency band, which is undesirable and is not transmitted, from the signal, and such a signal in a frequency band, which is undesirable and is not transmitted, will not be mixed into the cancellation signal NC.

Furthermore, since the reception tunable filter 26 is disposed between the multiplexer 11 and the reception circuit 23, for example, the reception tunable filter 26 can select a received signal in one frequency band corresponding to a transmission signal in a frequency band selected by the transmission tunable filter 25 and allow the received signal to pass through the reception tunable filter 26. Thus, signals in frequency bands other than the frequency band selected by the reception tunable filter 26 can be removed, and the S/N ratio of the received signals Rx1 and Rx2 can be improved.

Note that, in the second embodiment, although each of the frequency bands Ft1 and Ft2 of the transmission signals TX1 and TX2 has a bandwidth of, for example, about 60 MHz, and the frequency bandwidths of the transmission signals TX1 and TX2 that are actually used are, for example, about 5 MHz. Thus, the transmission tunable filter 25 may be formed of a narrow-band tunable filter that only allows signals in the frequency bandwidths that are used among the frequency bands Ft1 and Ft2 of the transmission signals TX1 and TX2 to pass through the narrow-band tunable filter. Similarly, the reception tunable filter 26 may be formed of a narrow-band tunable filter that only allows signals in the frequency bandwidths that are used among the frequency bands Fr1 and Fr2 of the received signals RX1 and RX2.

Figure 4:
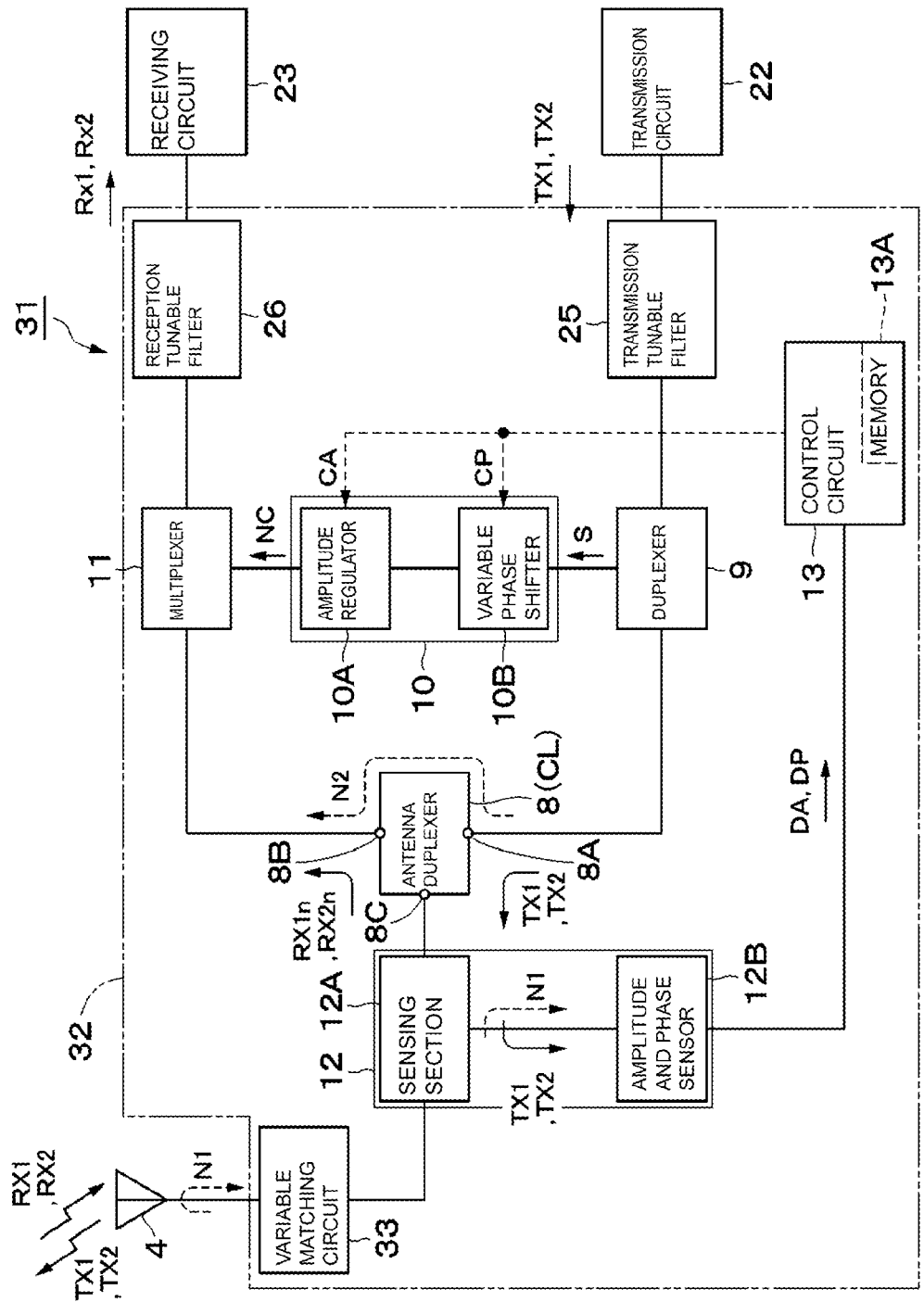
FIG. 4 is a block diagram illustrating a communication device according to a third embodiment.

A third embodiment of the present invention will now be described with reference to FIG. 4. The feature of the third embodiment is that a communication device further includes a variable matching circuit that variably adjusts the consistency between the communication device and an antenna. Note that, in the third embodiment, the same components as in the second embodiment are denoted by the same reference numerals, and descriptions thereof will be avoided.

Substantially similarly to the communication device 21 according to the second embodiment, a communication device 31 includes the transmission circuit 22, the reception circuit 23, the antenna 4, and a noise cancellation device 32. However, in the noise cancellation device 32, a variable matching circuit 33 is connected between the sensing section 12A and the antenna 4. This is the difference between the third embodiment and the second embodiment.

The variable matching circuit 33 is formed of, for example, a variable matching device (VMD). The variable matching circuit 33 is configured to perform impedance matching between the antenna 4 and the circulator CL, which serves as the antenna sharing device 8, in accordance with the variable impedance of the antenna 4.

As described above, advantageous effects similar to those of the second embodiment can be obtained in the third embodiment. In particular, in the third embodiment, since the variable matching circuit 33 is connected to the antenna 4, the reflected signal N1 from the antenna 4 can be reduced by the variable matching circuit 33, and the load of a noise cancellation function of the cancellation signal NC can be reduced.

Note that, in the third embodiment, although the case where the third embodiment is applied to the second embodiment has been described as an example, the third embodiment may be applied to the first embodiment.

A fourth embodiment of the present invention will now be described with reference to FIG. 5. The feature of the fourth embodiment is that a cancellation-signal-output circuit is provided with a delay circuit. Note that, in the fourth embodiment, the same components as in the first embodiment are denoted by the same reference numerals, and descriptions thereof will be avoided.

Substantially similarly to the communication device 1 according to the first embodiment, a communication device 41 includes the transmission circuit 2, the reception circuit 3, the antenna 4, and a noise cancellation device 42.

The noise cancellation device 42 includes the transmission filter 6, the reception filter 7, the antenna sharing device 8, the duplexer 9, a cancellation-signal-output circuit 43, the multiplexer 11, the reflected-signal detector 12, and the control circuit 13.

However, the cancellation-signal-output circuit 43 includes an amplitude regulator 43A, a variable phase shifter 43B, and a delay circuit 43C that delays the separated signal S. This is the difference between the fourth embodiment and the first embodiment.

As described above, advantageous effects similar to those of the first embodiment can be obtained in the fourth embodiment. In addition to this, in the fourth embodiment, since the cancellation-signal-output circuit 43 is provided with the delay circuit 43C, even in the case where a line length between the antenna 4 and the sensing section 12A is large, and where delay, for which only performing a phase adjustment is insufficient, occurs in the reflected signal N1, the cancellation signal NC, which has a phase opposite to that of the reflected signal N1 and an amplitude the same as that of the reflected signal N1, can be combined with the received signal RXn including noise signals by delaying the separated signal S by the delay circuit 43C. As a result, the reflected signal N1 can be removed even in the case where a large delay has occurred in the reflected signal N1.

Note that the delay circuit 43C includes a plurality of delay lines having different delay amounts and may be configured to select one of the plurality of delay lines that corresponds to the line length from the delay circuit 43C to the antenna 4. In this case, the noise cancellation device 42 can be applied to multiple types of the communication devices 41 each having a different antenna 4.

Figure 5:
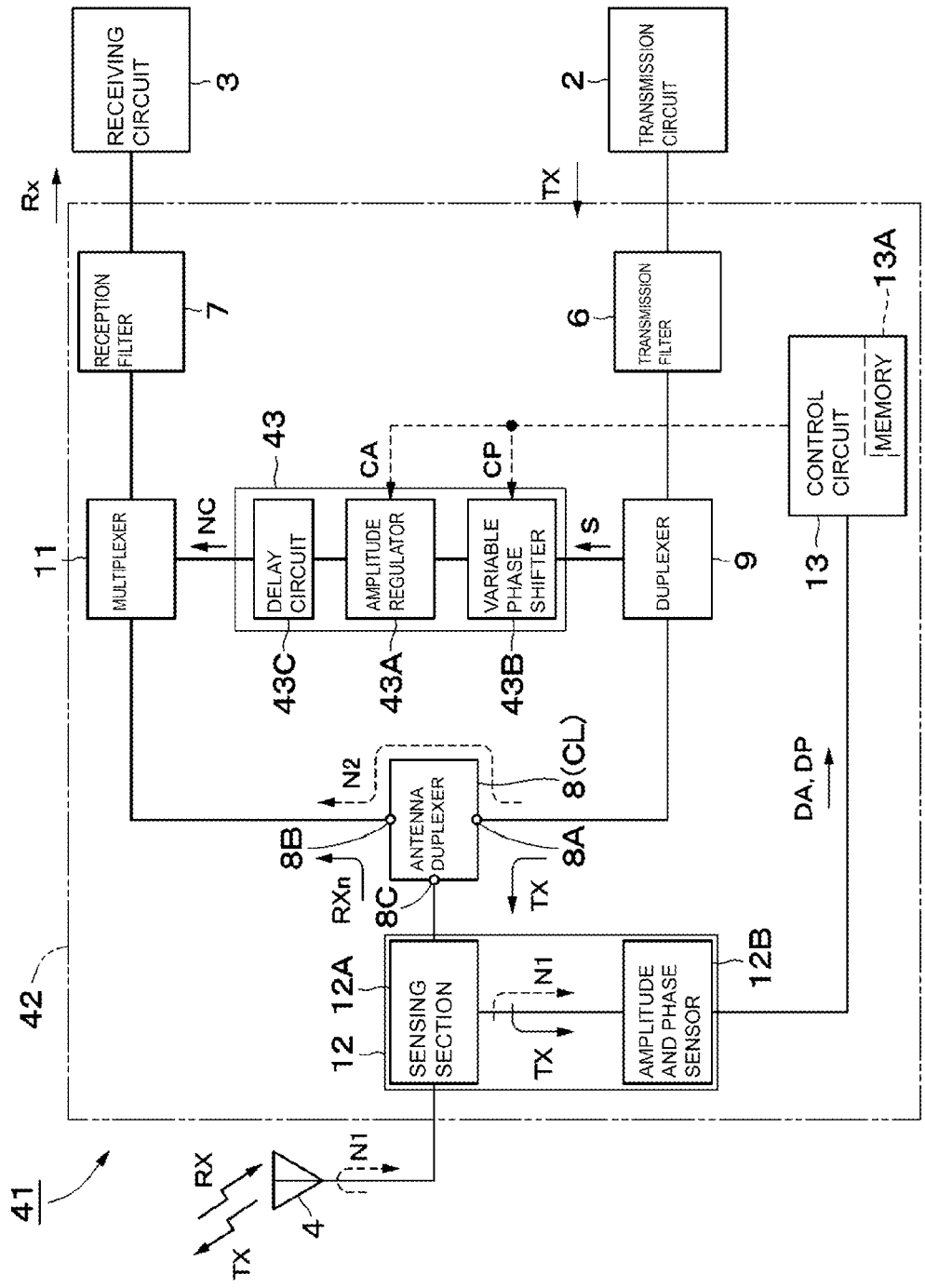
FIG. 5 is a block diagram illustrating a communication device according to a fourth embodiment.

Note that, although the case where the delay circuit 43C is disposed between the amplitude regulator 43A and the multiplexer 11 is illustrated in FIG. 5 as an example, the delay circuit 43C may be disposed between the amplitude regulator 43A and the variable phase shifter 43B or may be disposed between the variable phase shifter 43B and the duplexer 9.

Figure 6:
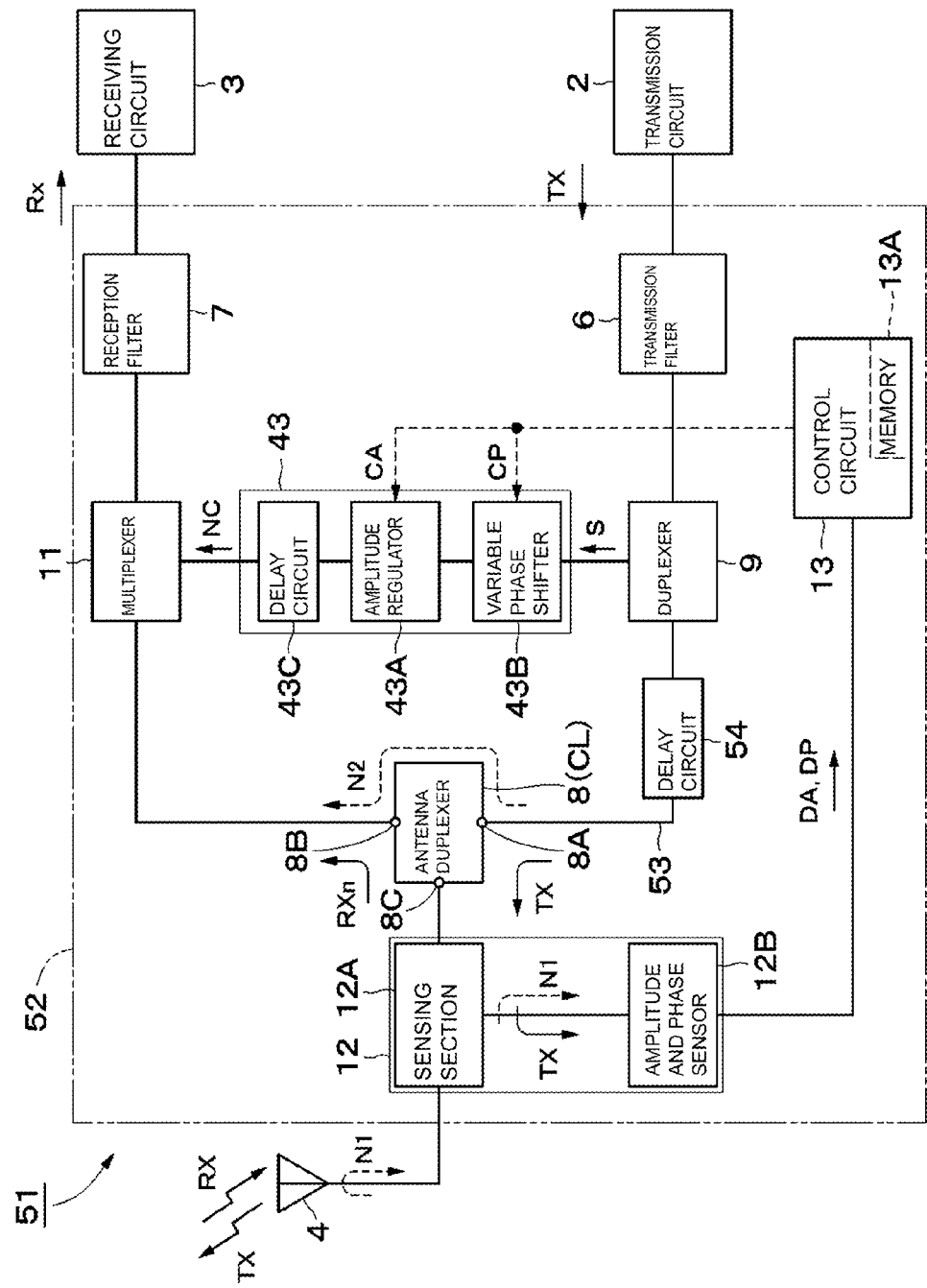
FIG. 6 is a block diagram illustrating a communication device according to a first modification.

In addition, like a communication device 51 according to a first modification illustrated in FIG. 6, a delay circuit 54, which is another delay circuit, may be disposed so as to be positioned at an intermediate portion of a connection line 53 that connects the duplexer 9 and multiplexer 11 via the antenna sharing device 8 in the configuration of the fourth embodiment illustrated in FIG. 5.

In this case, even in the case where the cancellation signal NC is delayed with respect to the reflected signal N1 of the received signal RXn by the amplitude regulator 43A and the variable phase shifter 43B, the cancellation signal NC, which has a phase opposite to that of the reflected signal N1 and an amplitude the same as that of the reflected signal N1, can be combined with the received signal RXn including the noise signals by delaying the transmission signal TX, which is the source of the reflected signal N1, by the delay circuit 54.

Note that although the case where the delay circuit 54 is disposed on the connection line 53 in such a manner as to be positioned between the duplexer 9 and the antenna sharing device 8 is illustrated in FIG. 6 as an example, the delay circuit 54 may be arranged at any position on the connection line 53 excluding the ends of the connection line 53, and the delay circuit 54 may be disposed between, for example, the antenna sharing device 8 and the multiplexer 11.

In addition, in the configuration of the first modification, the cancellation-signal-output circuit 43 is provided with the delay circuit 43C, and the delay circuit 54 is disposed so as to be positioned at an intermediate portion of the connection line 53, which connects the duplexer 9 and the multiplexer 11. However, the present invention is not limited to this configuration, and like the first to third embodiments, the first modification may be applied to a configuration in which a delay circuit is not included in a cancellation-signal-output circuit.

Figure 7:
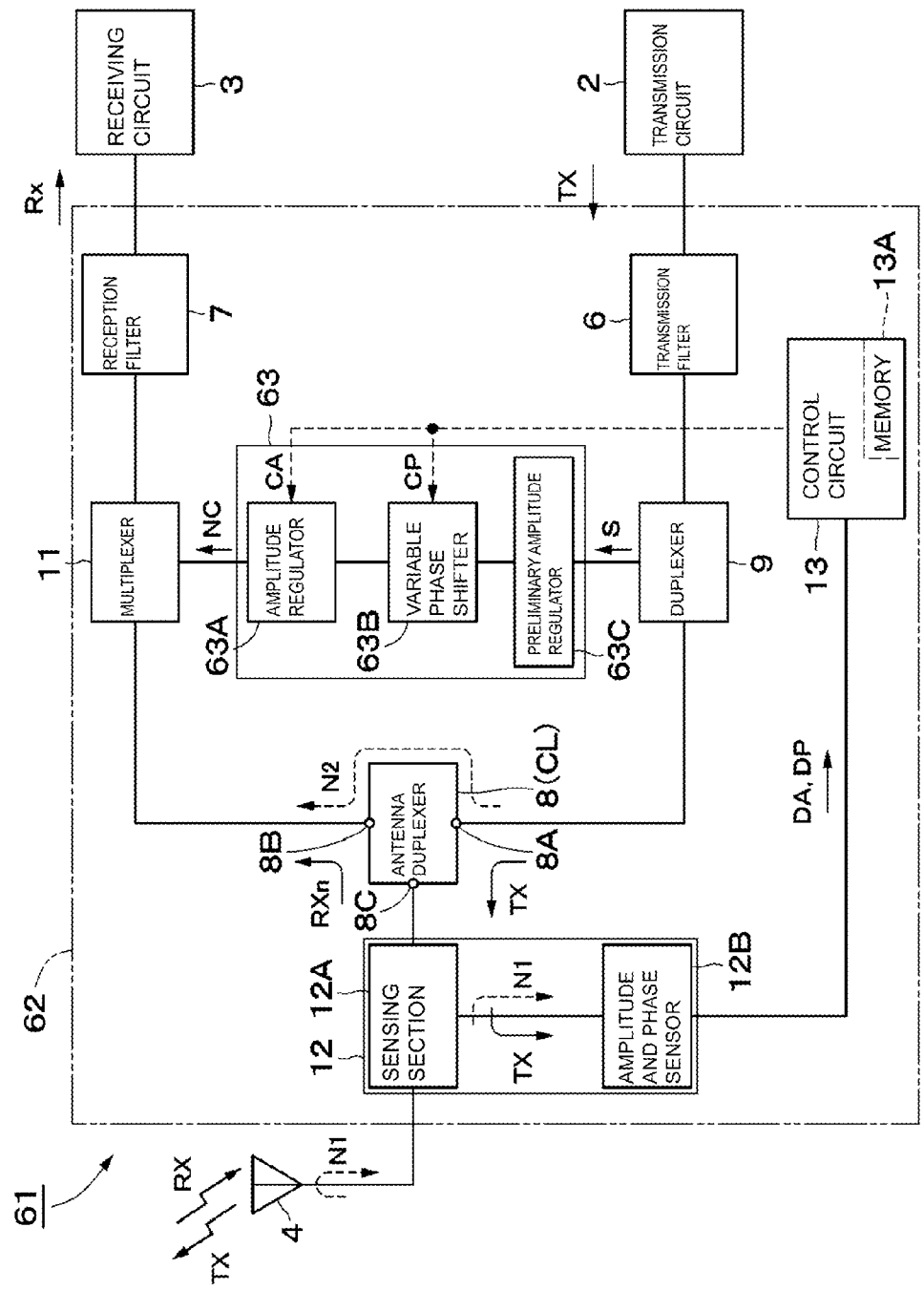
FIG. 7 is a block diagram illustrating a communication device according to a second modification.

In addition, like a communication device 61 according to a second modification illustrated in FIG. 7, a cancellation-signal-output circuit 63 of a noise cancellation device 62 may include an amplitude regulator 63A and a variable phase shifter 63B, and a preliminary amplitude regulator 63C may be provided on an upstream side of the amplitude regulator 63A in the configuration of the first embodiment.

In this case, the amplitude of the separated signal S can be adjusted by the preliminary amplitude regulator 63C at a predetermined fixed gain before the separated signal S is input to the amplitude regulator 63A, and a reduction in the load of the amplitude regulator 63A can be achieved.

Note that, in the second modification, although the case where the second modification is applied to the first embodiment has been described as an example, the second modification may be applied to the second to fourth embodiments or may be applied to the first modification.

Figure 8:
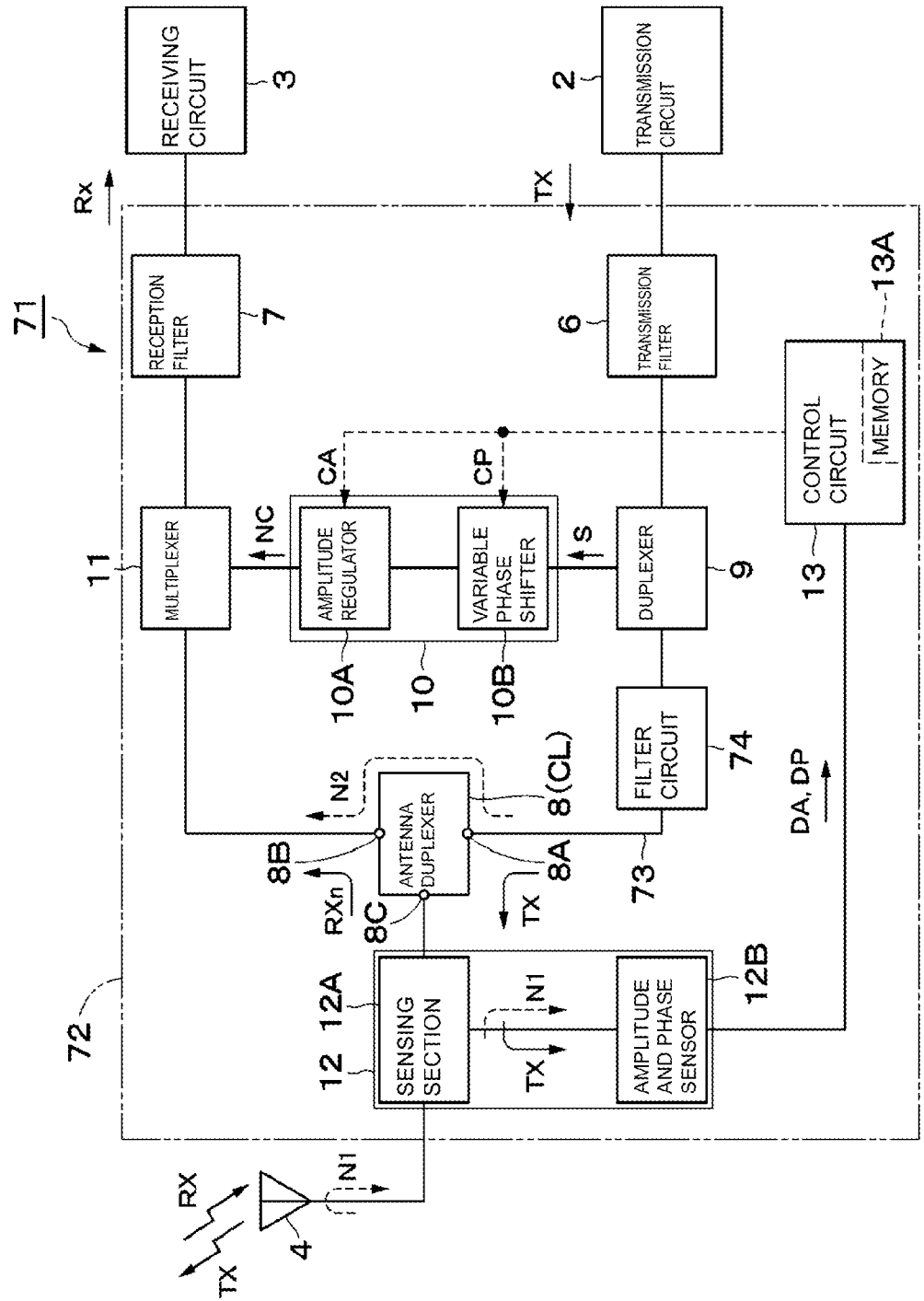
FIG. 8 is a block diagram illustrating a communication device according to a third modification.

In FIG. 7, the preliminary amplitude regulator 63C that amplifies the separated signal S is provided. However, even in the case where, like a communication device 71 according to a third modification illustrated in FIG. 8, a filter circuit 74, which causes a signal in a frequency band, which is desired to be cancelled, to be attenuated, is disposed on a connection line 73, which connects the antenna sharing device 8 and the duplexer 9, in place of the preliminary amplitude regulator 63C in a noise cancellation device 72, the above-described object can be achieved. The signal in the frequency band, which is desired to be cancelled, is attenuated, and accordingly, the load of the amplitude regulator 10A is reduced. Note that the filter circuit 74 may be a tunable filter. In addition, in the case where the filter circuit 74 is provided, the transmission filter 6 may be omitted.

Note that, in the third modification, although the case where the third modification is applied to the first embodiment has been described as an example, the third modification may be applied to the second to fourth embodiments or may be applied to the first and second modifications.

In the first embodiment, the amplitude-and-phase-adjustment map 14 only includes control values (frequency characteristics information) including one type of amplitude and phase corresponding to a transmit frequency that is to be used.

Figure 9:
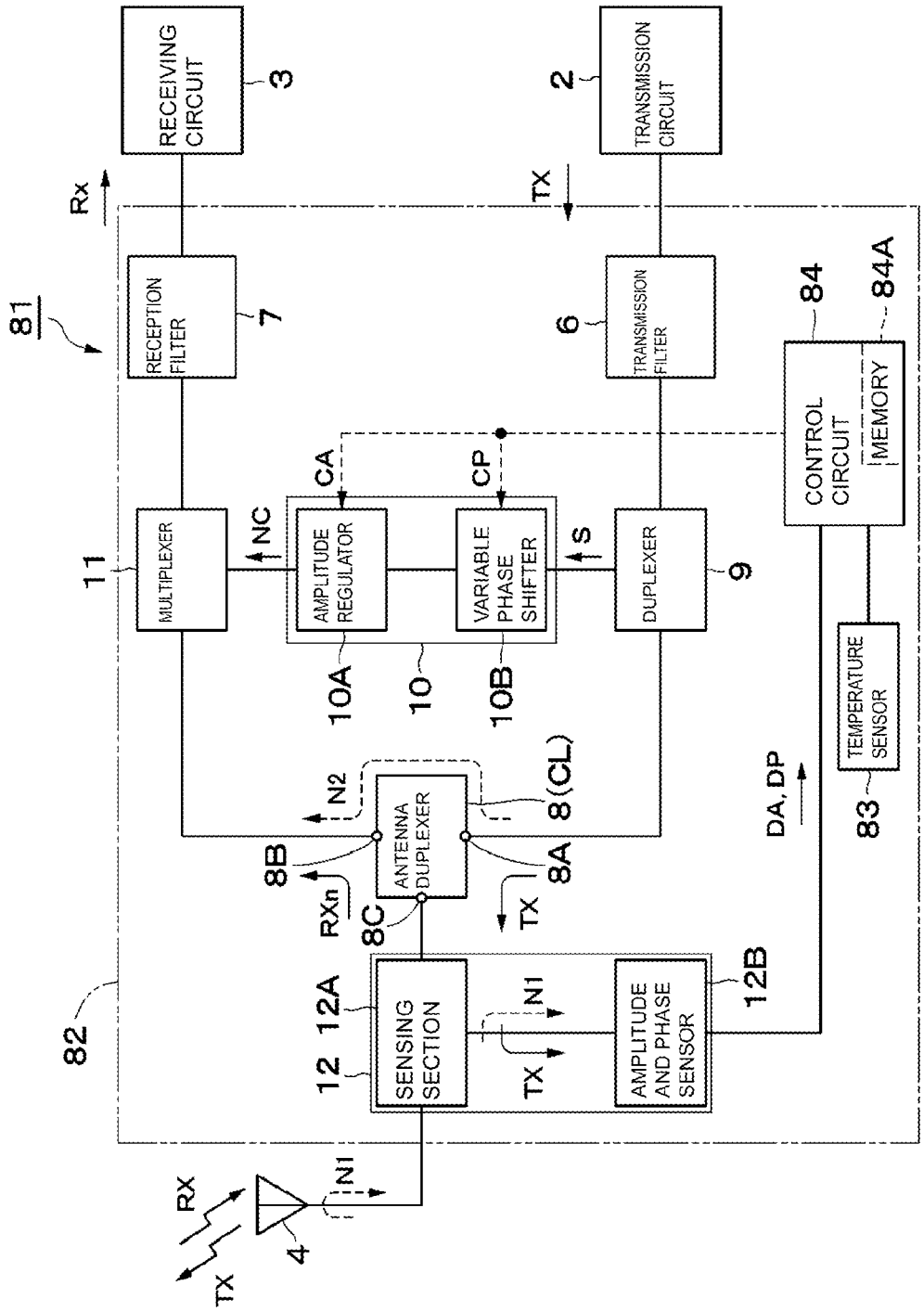
FIG. 9 is a block diagram illustrating a communication device according to a fourth modification.

However, the present invention is not limited to this, and like a communication device 81 according to a fourth modification illustrated in FIG. 9, a noise cancellation device 82 may include a temperature sensor 83, and an amplitude-and-phase-adjustment map 85 stored in a memory 84A of a control circuit 84 may include frequency characteristics information similar to those included in the amplitude-and-phase-adjustment map 14 and temperature characteristics information based on a temperature in which the communication device 81 is used.

In this case, the control circuit 84 obtains temperature information such as, for example, temperatures T1 to T3 from the temperature sensor 83. As illustrated in FIG. 10, the amplitude-and-phase-adjustment map 85 selects any one of three types of amplitudes of the cancellation signal NC, which are $Ac_{11}$ to $Ac_{1n}$, $Ac_{21}$ to $Ac_{2n}$, and $Ac_{31}$ to $Ac_{3n}$, in accordance with the temperature information and selects any one of three types of phases of the cancellation signal NC, which are $\theta c_{11}$ to $\theta c_{1m}$, $\theta c_{21}$ to $\theta c_{2m}$, and $\theta c_{31}$ to $\theta c_{3m}$.

In the case where the temperature information from the temperature sensor 83 does not match the temperatures T1, T2, and T3, an interpolation processing is performed on the values of the amplitude-and-phase-adjustment map 85 by interpolation-processing means that is included in the control circuit 84, and the amplitude and the phase corresponding to the temperature information are calculated. Note that the number of types of the temperature information is not limited to three and may be two or may be four or larger.

In communication devices, variations in the characteristics of the communication devices may sometimes occur due to variations in components to be used. Considering this, the amplitude and phase adjustment map may include frequency characteristics information and information of multiple types of products that are usable in such communication devices and may be configured to suitably select, when a product is determined, the information of one of the multiple types of products appropriate for the determined product. In addition, the amplitude and phase adjustment map may include all of frequency characteristics information, temperature characteristics information, and product information or may include information other than this information. The control circuit is configured to suitably select the above-described various information if necessary. These configurations can be applied to the second to fourth embodiments and the first to third modifications.

In each of the above-described embodiments, although the case where the circulator CL is used as the antenna sharing device 8 has been described as an example, a configuration in which, for example, a duplexer or the like is used as the antenna sharing device may be employed.

In the second and third embodiments, although the configurations in which the multi-band communication devices 21 and 31 use the transmission signals TX1 and TX2 in the two frequency bands Ft1 and Ft2 and the received signals RX1 and RX2 in the two frequency bands Fr1 and Fr2 have been described as examples, the second and third embodiments may be applied to a communication device that uses a transmission device and a reception device each having three or more frequency bands.

In the above-described embodiments and the above-described modifications, the control circuits 13 and 84 are configured to calculate the amplitude and the phase of the cancellation signal NC from the detection signals DA and DP by using the amplitude-and-phase-adjustment maps 14 and 85. However, the present invention is not limited to this configuration, and the control circuit may be configured to calculate the amplitude and the phase of the cancellation signal by performing various arithmetic processing on the detection signals.

In the above-described embodiments and the above-described modifications, although each of the noise cancellation devices 5, 24, 32, 42, 52, 62, 72, and 82 includes the transmission filter 6 or the transmission tunable filter 25, these filters may be omitted.

In the above-described embodiments and the above-described modifications, although each of the noise cancellation devices 5, 24, 32, 42, 52, 62, 72, and 82 includes the reception filter 7 or the reception tunable filter 26, these filters may be omitted.

In the above-described embodiments and the above-described modifications, although the case where the present invention is applied to the communication devices 1, 21, 31, 41, 51, 61, 71, and 81, each of which serve as a transmitting/reception device, has been described as an example, the present invention can be applied to various transmitting/reception devices as long as such transmitting/reception devices each have a configuration in which the isolation between the transmission circuit 2 and the receiving circuit 3 is improved by the transmission filter 6 and the transmission tunable filter 25.

1, 21, 31, 41, 51, 61, 71, 81 communication device (transmission/reception device)
2, 22 transmission circuit
3, 23 reception circuit
4 antenna
5, 24, 32, 42, 52, 62, 72, 82 noise cancellation device
6 transmission filter
7 reception filter
8 antenna sharing device
9 duplexer
10, 43, 63 cancellation-signal-output circuit
11 multiplexer
12 reflected-signal detector (reflected-signal-detection means)
13, 84 control circuit
25 transmission tunable filter (transmission filter)
26 reception tunable filter (transmission filter)
33 variable matching circuit
43C, 54 delay circuit
53, 73 connection line
63C preliminary amplitude regulator
74 filter circuit

The invention claimed is:
1. A transmission/reception device comprising:
a transmission circuit;
a reception circuit;
an antenna;
an antenna sharing device connecting the antenna to the transmission circuit and connecting the antenna to the reception circuit;
reflected-signal-detection means disposed between the antenna sharing device and the antenna and detecting a reflected signal, wherein the reflected signal is a part of a transmission signal output from the transmission circuit and reflected by the antenna;
a duplexer disposed between the antenna sharing device and the transmission circuit and retrieving a signal from the transmission signal;
a cancellation-signal-output circuit outputting a cancellation signal used for cancelling the reflected signal based on the signal retrieved by the duplexer;
a multiplexer disposed between the antenna sharing device and the reception circuit and combining the cancellation signal with a received signal to be input to the reception circuit;

a delay circuit disposed on at least one of first and second connection lines, the first connection line connecting the duplexer to the multiplexer via the cancellation-signal-output circuit and the second connection line connecting the duplexer to the multiplexer via the antenna sharing device; and a control circuit controlling the cancellation-signal-output circuit, wherein the control circuit adjusts an amplitude and a phase of the cancellation signal based on an amplitude and a phase of the reflected signal detected by the reflected-signal-detection means.

2. A transmission/reception device comprising:

a transmission circuit;

a reception circuit;

an antenna;

an antenna sharing device connecting the antenna to the transmission circuit and connecting the antenna to the reception circuit;

reflected-signal-detection means disposed between the antenna sharing device and the antenna and detecting a reflected signal, wherein the reflected signal is a part of a transmission signal output from the transmission circuit and reflected by the antenna;

a transmission filter connected to the transmission circuit and allowing a signal in a frequency band of the transmission signal to pass through the transmission filter and blocking signals in other frequency bands;

a duplexer disposed between the antenna sharing device and the transmission filter and retrieving a signal from the transmission signal;

a cancellation-signal-output circuit outputting a cancellation signal used for cancelling the reflected signal based on the signal retrieved by the duplexer;

a multiplexer disposed between the antenna sharing device and the reception circuit and combining the cancellation signal with a received signal to be input to the reception circuit;

a delay circuit disposed on at least one of first and second connection lines, the first connection line connecting the duplexer to the multiplexer via the cancellation-signal-output circuit and the second connection line connecting the duplexer to the multiplexer via the antenna sharing device; and a control circuit controlling the cancellation-signal-output circuit, wherein the control circuit adjusts an amplitude and a phase of the cancellation signal based on an amplitude and a phase of the reflected signal detected by the reflected-signal-detection means.

3. The transmission/reception device according to claim 1, further comprising:

a filter circuit disposed between the duplexer and the antenna sharing device and causing a signal desired to be cancelled in a frequency band of the transmission signal to be attenuated.

4. A transmission/reception device comprising:

a transmission circuit;

a reception circuit;

an antenna;

an antenna sharing device connecting the antenna to the transmission circuit and connecting the antenna to the reception circuit;

reflected-signal-detection means disposed between the antenna sharing device and the antenna and detecting a reflected signal, wherein the reflected signal is a part of a transmission signal output from the transmission circuit and reflected by the antenna;

a transmission filter connected to the transmission circuit and allowing a signal in a frequency band of the transmission signal to pass through the transmission filter and blocking signals in other frequency bands;

a duplexer disposed between the antenna sharing device and the transmission filter and retrieving a signal from the transmission signal;

a filter circuit disposed between the duplexer and the antenna sharing device and causing a signal desired to be cancelled in the frequency band of the transmission signal to be attenuated;

a cancellation-signal-output circuit outputting a cancellation signal used for cancelling the reflected signal based on the signal retrieved by the duplexer;

a multiplexer disposed between the antenna sharing device and the reception circuit and combining the cancellation signal with a received signal to be input to the reception circuit;

a delay circuit disposed on at least one of first and second connection lines, the first connection line connecting the duplexer to the multiplexer via the cancellation-signal-output circuit and the second connection line connecting the duplexer to the multiplexer via the antenna sharing device; and a control circuit controlling the cancellation-signal-output circuit, wherein the control circuit adjusts an amplitude and a phase of the cancellation signal based on an amplitude and a phase of the reflected signal detected by the reflected-signal-detection means.

5. The transmission/reception device according to claim 2, wherein the transmission filter comprises a transmission tunable filter selecting any one of a plurality of the transmission signals in a plurality of frequency bands and allowing the selected transmission signal to pass through the transmission tunable filter.

6. The transmission/reception device according to claim 3, wherein the filter circuit comprises a tunable filter that selecting any one of a plurality of the transmission signals in a plurality of frequency bands and allowing the selected transmission signal to pass through the tunable filter.

7. The transmission/reception device according to claim 1, wherein the antenna sharing device comprises a circulator.

8. The transmission/reception device according to claim 4, wherein the transmission filter comprises a transmission tunable filter selecting any one of a plurality of the transmission signals in a plurality of frequency bands and allowing the selected transmission signal to pass through the transmission tunable filter.

9. The transmission/reception device according to claim 2, wherein the antenna sharing device comprises a circulator.

10. The transmission/reception device according to claim 3, wherein the antenna sharing device comprises a circulator.

11. The transmission/reception device according to claim 4, wherein the antenna sharing device comprises a circulator.

12. The transmission/reception device according to claim 1, further comprising a variable matching circuit connected between the antenna and the reflected-signal-detection means, wherein the variable matching circuit is configured to perform impedance matching between the antenna and the antenna sharing device.

13. The transmission/reception device according to claim 2, further comprising a variable matching circuit connected between the antenna and the reflected-signal-detection means, wherein the variable matching circuit is configured to perform impedance matching between the antenna and the antenna sharing device.

* * * * *